United States Patent
Sun et al.

(10) Patent No.: US 12,363,787 B2
(45) Date of Patent: Jul. 15, 2025

(54) MECHANISMS FOR MANAGING USER EQUIPMENT ON SIDELINK COMMUNICATION

(71) Applicant: Apple Inc., Cupertino, CA (US)

(72) Inventors: Haitong Sun, Cupertino, CA (US); Chunxuan Ye, San Diego, CA (US); Haijing Hu, Los Gatos, CA (US); Wei Zeng, Saratoga, CA (US); Dawei Zhang, Saratoga, CA (US); Yuqin Chen, Beijing (CN); Fangli Xu, Beijing (CN); Zhibin Wu, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/441,630

(22) PCT Filed: Sep. 25, 2020

(86) PCT No.: PCT/CN2020/117563
§ 371 (c)(1),
(2) Date: Sep. 21, 2021

(87) PCT Pub. No.: WO2022/061681
PCT Pub. Date: Mar. 31, 2022

(65) Prior Publication Data
US 2023/0217536 A1    Jul. 6, 2023

(51) Int. Cl.
*H04W 76/28*    (2018.01)

(52) U.S. Cl.
CPC .................. *H04W 76/28* (2018.02)

(58) Field of Classification Search
CPC ..... H04W 76/28; H04W 76/27; H04W 76/14; H04W 92/18; Y02D 30/70
See application file for complete search history.

(56) References Cited

U.S. PATENT DOCUMENTS

| 12,160,822 B2 | 12/2024 | Xu et al. |
| 2016/0044740 A1 | 2/2016 | Siomina et al. |

(Continued)

FOREIGN PATENT DOCUMENTS

| CN | 108307486 A | 7/2018 |
| CN | 111670603 A | 9/2020 |
| EP | 3 500 028 A1 | 6/2019 |
| WO | WO 2018/064477 A1 | 5/2018 |

OTHER PUBLICATIONS

International Search Report and Written Opinion of the International Searching Authority directed to related International Patent Application No. PCT/CN2020/117563, mailed Jun. 23, 2021; 9 pages.

(Continued)

*Primary Examiner* — Ricky Q Ngo
*Assistant Examiner* — Kabir U Jahangir
(74) *Attorney, Agent, or Firm* — Sterne, Kessler, Goldstein & Fox P.L.L.C.

(57) ABSTRACT

Some aspects of this disclosure relate to apparatuses and methods for implementing sidelink communications among multiple user equipments (UEs). A UE operates according to a periodical discontinuous reception (DRX) cycle that includes a sidelink on-duration period when the UE is in an active state. The UE is in a power saving state outside the sidelink on-duration period. The UE listens to a Physical Sidelink Control Channel (PSCCH) for sidelink communications during the active state. A UE determines the DRX cycle and the sidelink on-duration period of a receiver UE, and sends a message to the receiver UE during one or more slots of the sidelink on-duration period when the receiver UE is in the active state.

19 Claims, 12 Drawing Sheets

(56) References Cited

U.S. PATENT DOCUMENTS

| | | | |
|---|---|---|---|
| 2019/0098689 A1 | 3/2019 | Wei et al. | |
| 2022/0046622 A1* | 2/2022 | Yang | H04W 76/28 |
| 2023/0014303 A1* | 1/2023 | Di Girolamo | H04W 72/20 |
| 2023/0066448 A1* | 3/2023 | Tseng | H04W 76/28 |
| 2023/0105751 A1* | 4/2023 | Lee | H04W 76/15 |
| | | | 370/329 |
| 2023/0107246 A1* | 4/2023 | Kang | H04W 52/02 |
| | | | 370/329 |
| 2023/0164696 A1* | 5/2023 | Yang | H04W 52/0216 |
| | | | 370/311 |
| 2023/0209649 A1* | 6/2023 | Liu | H04W 76/28 |
| | | | 370/329 |
| 2023/0292391 A1* | 9/2023 | Mochizuki | H04W 52/0232 |
| | | | 370/315 |

OTHER PUBLICATIONS

Vivo: 'Discussion on sidelink DRX', 3GPP Draft; R1-2005405, 3GPP TSG RAN WG1 #102-e, e-Meeting, Aug. 2020; 3 pages.
ETRI: 'DRX operation related to DRD Communications', 3GPP Draft; R2-145018, 3GPP TSG-RAN WG2 #88, San Francisco, USA, Nov. 2014; 3 pages.
Supplementary European Search Report, dated Jul. 7, 2023, for European Patent Appl. No. 20954533.4, 8 pages.
First Office Action directed to related Chinese Application No. 202080105150.2, mailed Sep. 20, 2024, with English-language machine translation attached; 20 pages.

\* cited by examiner

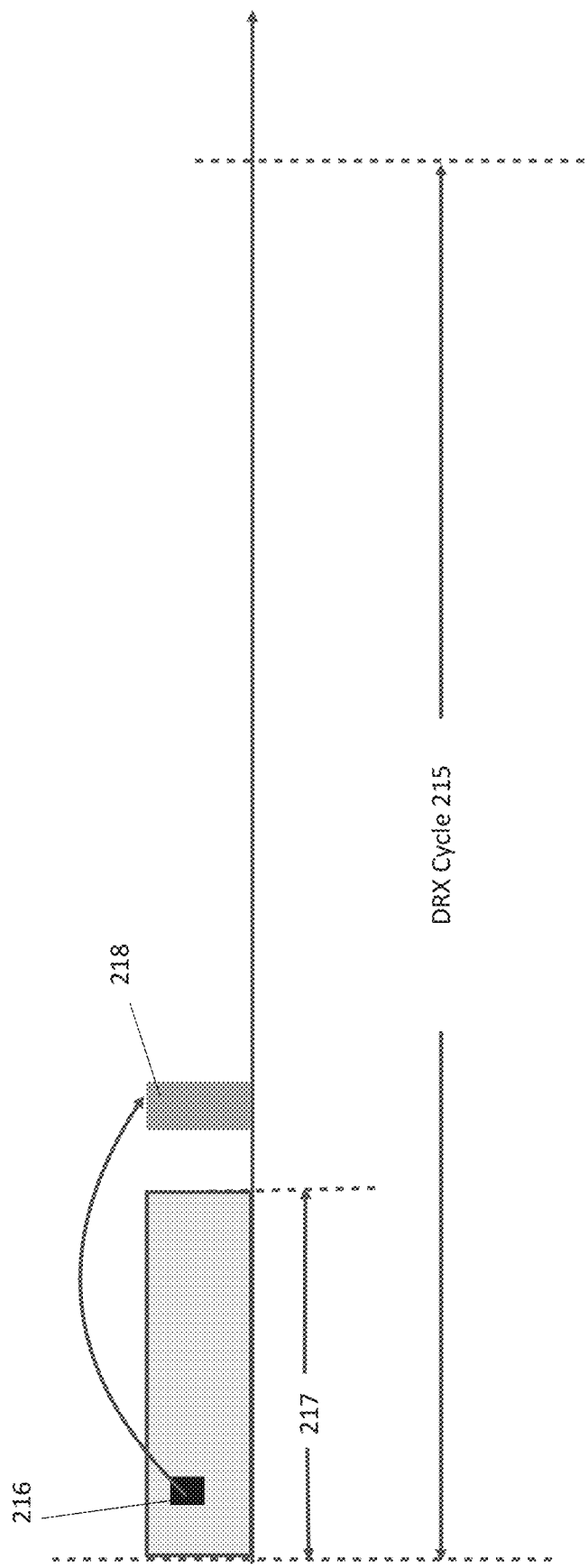

MECHANISMS FOR MANAGING USER EQUIPMENT ON SIDELINK COMMUNICATION

This application is a U.S. National Phase of International Application No. PCT/CN2020/117563, filed Sep. 25, 2020, which is hereby incorporated by reference in its entirety.

BACKGROUND

Field

The described aspects generally relate to managing user equipments on sidelink communication in a wireless communication system.

Related Art

A user equipment (UE) communicates with a base station (for example, an evolved Node B (eNB), a next generation node B (gNB), or other base station) in a wireless communication network or system. In addition, device-to-device (D2D) or sidelink communication among UEs is becoming more and more important for information exchange in wireless communication systems. Sidelink communication enables direct communication between proximate devices, e.g., multiple UEs, without going through the base station, leading to lower latency for communication among UEs. However, there are various issues to be resolved for sidelink communication among UEs in a wireless communication system.

SUMMARY

Some aspects of this disclosure relate to apparatuses and methods for implementing device-to-device (D2D) or sidelink communications among multiple user equipments (UEs) in wireless communication systems, e.g., a wireless communication system based on 3rd Generation Partnership Project (3GPP) release 16 (Rel-16), release 17 (Rel-17), or beyond. For example, systems and methods are provided implementing designs for New Radio (NR) wireless systems.

Some aspects of this disclosure relate to a UE. The UE includes a transceiver and a processor communicatively coupled to the transceiver. The transceiver is configured to wirelessly communicate through a first interface for sidelink communication with one or more UEs including a receiver UE. The receiver UE can be an in-coverage UE, an out-of-coverage UE, or a partial-coverage UE. The transceiver is further configured to wirelessly communicate with a base station through a second interface supporting uplink and downlink transmissions between the base station and the UE. In some examples, the first interface is a PC5 interface and the second interface is a Uu interface.

In some examples, the processor is configured to determine a discontinuous reception (DRX) cycle of the receiver UE that includes a first number of slots. The processor is further configured to determine a sidelink on-duration period within the DRX cycle, where the sidelink on-duration period includes a second number of slots that is less than the first number of slots. In some examples, the second number of slots within the sidelink on-duration period are consecutive slots. During the sidelink on-duration period, the receiver UE is in an active state to listen to a Physical Sidelink Control Channel (PSCCH). The DRX cycle of the receiver UE further includes a power saving state having a third number of slots when the receiver UE refrains from listening to PSCCH. Furthermore, the processor is configured to send a message, using the transceiver, to the receiver UE during one or more slots of the sidelink on-duration period. The message is sent to the receiver UE by a broadcast transmission, a groupcast transmission, or a unicast transmission. In some examples, the message to the receiver UE is carried in a sidelink medium access control (MAC) Control Element (MAC CE), and includes a configuration to define one or more slots for the receiver UE to respond to the UE.

In some examples, the DRX cycle of the receiver UE is a first DRX cycle of a first receiver UE, and the UE is further configured to wirelessly communicate through the first interface for sidelink communication with a second receiver UE. The processor is further configured to determine a second DRX cycle of the second receiver UE, and a second sidelink on-duration period within the second DRX cycle. During the second sidelink on-duration period, the second receiver UE is in an active state to listen to the PSCCH. In addition, the processor is configured to determine one or more slots when the first receiver UE and the second receiver UE are both in the active state. Afterwards, the processor is configured to send a message, using the transceiver, to the first receiver UE and the second receiver UE in a one-to-many communication during the one or more slots when the first receiver UE and the second receiver UE are both in the active state.

In some examples, the first DRX cycle of the first receiver UE has a same time period as the second DRX cycle of the second receiver UE with respect to a timing reference, and the first sidelink on-duration period has a same time period as the second sidelink on-duration period with respect to the timing reference. In some other examples, the first sidelink on-duration period can have a length different from a length of the second sidelink on-duration period. In some other examples, the first DRX cycle of the first receiver UE has a first offset with respect to a timing reference, and the second DRX cycle of the second receiver UE has a second offset with respect to the timing reference, where the first offset has a length different from a length of the second offset. Further in some other examples, the first DRX cycle of the first receiver UE has a first length T, the second DRX cycle of the second receiver UE has a second length, where the first length is ½ a of the second length or ¼ of the second length. In some examples, the offset and on-duration configuration of a DRX cycle ensure that the active time of multiple receiver UEs overlap with each other in a deterministic way, and are further repeated at least every length of m*T, where m*T corresponding to a longest DRX cycle among all receiver UEs, so that the UE can find a common slot to transmit to the multiple UEs conveniently when they are all in the active state.

Some aspects of this disclosure relate to a method for operating a UE. The method includes receiving a configuration for a DRX cycle having a sidelink on-duration period within the DRX cycle. The UE is in an active state during the sidelink on-duration period, and the UE is in a power saving state outside the sidelink on-duration period. Afterwards, the method includes listening to a PSCCH during at least one slot within the sidelink on-duration period for a message from an other UE that wirelessly communicates through a PC5 interface for sidelink communication with the UE. The UE refrains from listening to the PSCCH when the UE is in the power saving state. The method further includes receiving a message from the other UE through the PC5 interface for sidelink communication when the US is in the active state. In some examples, the message has a destination address that matches a sidelink address of the UE. Based on the received message, the method includes determining a configuration that defines one or more slots for the UE to respond to the other UE. Afterwards, the method includes sending a response message to the other UE based on the determined configuration. Some aspects of this disclosure relate to how to configure a UE for a DRX cycle. A DRX cycle of a UE can be configured by RRC signaling from the base station for an in-coverage UE, and by pre-configuration for an out-of-coverage UE. For the configuration flexibility and allowing a UE to choose a trade-off between power savings and delivery latency, multiple different DRX configurations can be provided based on different sidelink addresses, services, or QoS requirements.

Some aspects of this disclosure relate to a method for operating a UE. The method includes receiving a configuration for a DRX cycle having a sidelink on-duration period within the DRX cycle. The UE is in an active state during the sidelink on-duration period, and the UE is in a power saving state outside the sidelink on-duration period. The method further includes setting an activity tracking timer to keep track of the DRX cycle and the sidelink on-duration period based on an offset with respect to a time reference. In some examples, the configuration for the DRX cycle, the sidelink on-duration period, activity tracking timer, and the offset with respect to the time reference is configured in a RRC message from a base station that wirelessly communicates to the UE through an interface supporting uplink and downlink transmissions between the base station and the UE. The setting the activity tracking timer to keep track of the DRX cycle and the sidelink on-duration period includes setting a first timer to be the activity tracking timer to keep track of the DRX cycle, and setting a second timer to keep track the sidelink on-duration period. Similarly, in some embodiments, a first timer to be the activity tracking timer to keep track of the DRX cycle, and setting a second timer to keep track the sidelink on-duration period In addition, the method includes listening to a PSCCH during at least one slot within the sidelink on-duration period for a message from an other UE that wirelessly communicates through a PC5 interface for sidelink communication with the UE, and receiving a message in the PSCCH from the other UE through the PC5 interface for sidelink communication when the UE is in the active state and the message has a destination address that matches a sidelink address of the UE. In some embodiments, the message can be received through the PSCCH and/or Physical Sidelink Shared Channel (PSSCH). After receiving the message, the method includes restarting the activity tracking timer to keep track of the DRX cycle and the sidelink on-duration period. In some embodiments, when UE first receives a message in PSCCH/PSSCH that matches its own address in the sidelink on-duration period of the DRX cycle, the UE can stop a first timer which tracks the sidelink on-duration period and start a second timer as activity tracking timer to track the traffic activities within the DRX cycle.

This Summary is provided merely for purposes of illustrating some aspects to provide an understanding of the subject matter described herein. Accordingly, the above-described features are merely examples and should not be construed to narrow the scope or spirit of the subject matter in this disclosure. Other features, aspects, and advantages of this disclosure will become apparent from the following Detailed Description, Figures. and Claims.

BRIEF DESCRIPTION OF THE FIGURES

The accompanying drawings, which are incorporated herein and form part of the specification, illustrate the present disclosure and, together with the description, further serve to explain the principles of the disclosure and enable a person of skill in the relevant art(s) to make and use the disclosure.

FIGS. 2A-2C illustrate an example wireless system including multiple UEs operating according to discontinuous reception (DRX) cycles containing sidelink on-duration periods for sidelink communications, according to some aspects of the disclosure.

Figure 1:
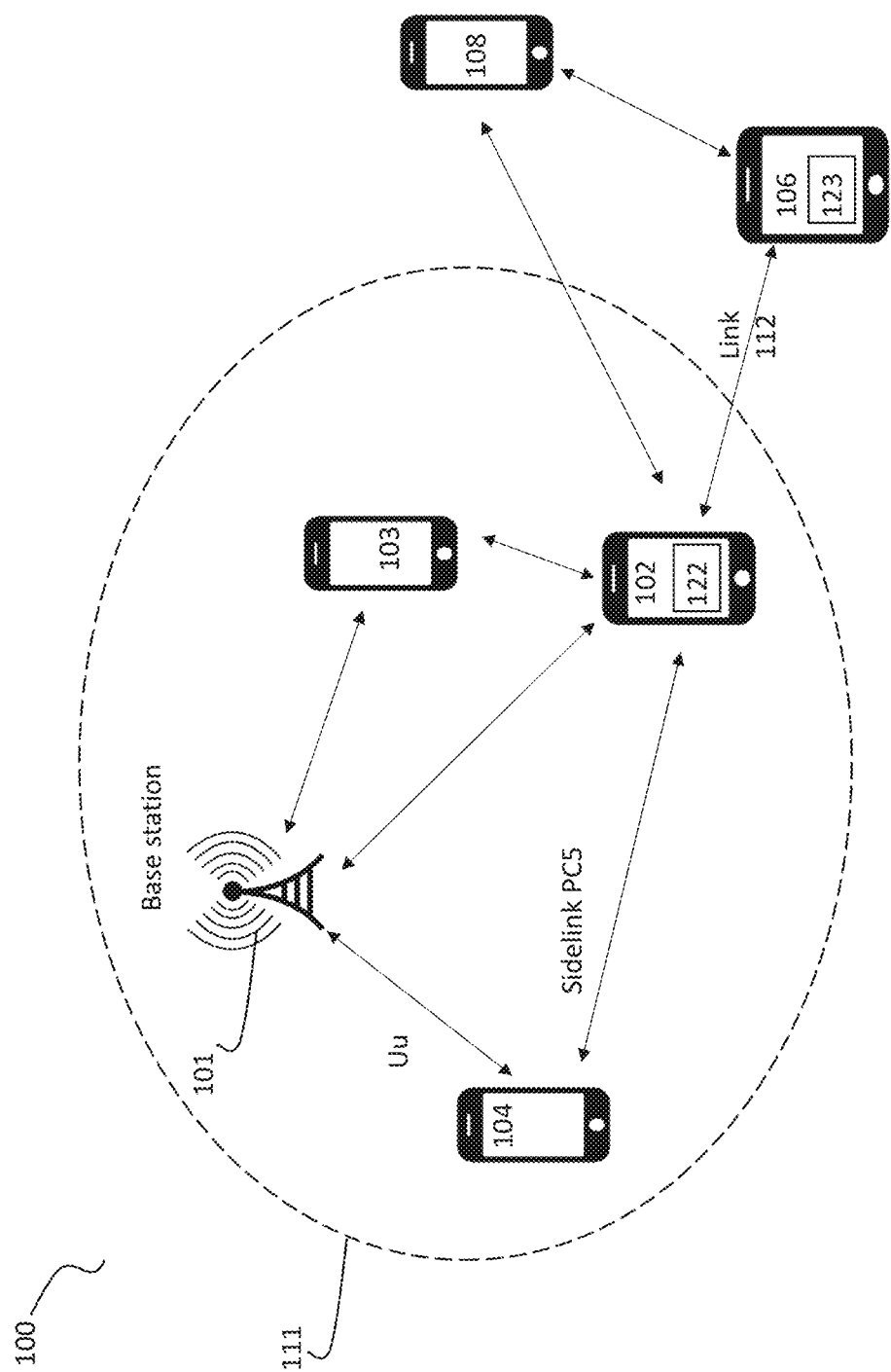
FIG. 1 illustrates an example wireless system implementing designs for sidelink communications among multiple user equipments (UEs), according to some aspects of the disclosure.

The present disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

In a wireless system, a user equipment (UE) can communicate via uplink and downlink with a base station (for example, an evolved Node B (eNB), a next generation node B (gNB), or other base station) in a wireless communication network or system. In addition, a UE can communicate with one or more UEs directly by device-to-device (D2D) or sidelink (SL) communication through sidelink channels. Various sidelink channels are defined in an interface for sidelink communication. e.g., Physical Sidelink Control Channel (PSCCH) in a PC5 interface. Compared to the conventional cellular communication, sidelink communication can have many advantages, e.g., more efficient and transparent to achieve higher spectral efficiency and low latency. Other terms have been used to describe SL related communication systems, e.g., proximity service (ProSe) communication, D2D communication. Even though those terms, e.g., SL communication, D2D communication, ProSe communication, can differ from each other in some aspects. In the current disclosure, SL, D2D, and ProSe are used interchangeably. SL communication can operate using both licensed cellular spectrum (known as in-band communication) and unlicensed spectrum (known as out-band communication).

Power management is an important issue for UEs. To conserve battery of a UE, the UE can enter an idle mode with reduced communication or computation activities. If a UE is in connected mode with a base station and it has no data to send or receive, then the base station can instruct the UE to enter idle mode after a certain amount of time, e.g., based on a timer. In detail, the base station can send a Radio Resource Control (RRC) release message to the UE so that the UE can enter an idle mode. When a UE is in the idle mode, a procedure has to be available to access the UE in the idle mode if there is downlink data for the UE. In a wireless system, paging is a mechanism to initiate services for UEs that are in idle mode. When a UE is located in a coverage area of a base station, the base station maintains a unique identification for the UE so as to identify the UE. Therefore, the base station can perform a paging operation to bring the UE out of idle mode. A paging message can be a one-to-one message to a specific UE, or a one-to-many message that can be a groupcast message or a broadcast message.

However, performing a paging operation over SL is more complex. A UE does not have a unique identifier to identify other peer UEs around the UE so that the UE can notify other peer UEs based on their identifiers. Instead, a SL link is identified by a pair of layer two (L2) addresses. Hence, a UE can be associated with multiple L2 addresses during multiple sidelinks. In existing technology, a UE cannot know whether a peer UE is active or not. When a UE performs a paging operation to one or more other UEs, there can be no established connections between the UE and one or more other UEs. A current solution can have a UE to constantly listen or monitor a control channel of SL communication, e.g., a PSCCH in a PC5 interface. However, such a solution can be power consuming for the UE.

Some aspects of this disclosure provide improved solutions to SL communication with reduced power consumptions for the UEs. Instead of listening or monitoring other UEs all the time, a UE can be in different states with different power consumptions. For example, a UE can be in an active state when the UE listens or monitors messages from other UEs through SL communication. In addition, a UE can be in a power saving state when the UE does not listen to or monitor messages from other UEs, or refrains from listening to messages. Hence, the UE can save power when the UE is in a power saving state. A UE can periodically go through the active state and the power saving state in cycles, which is called a discontinuous reception (DRX) cycle. In detail, a DRX cycle of a UE includes a first number of slots. A DRX cycle includes a sidelink on-duration period that includes a second number of slots that is less than, e.g. a subset of, the first number of slots. The UE is supposed to be in an active state when the UE is at least in the sidelink on-duration period. The UE is in a power saving state in the other slots of the DRX cycle outside the sidelink on-duration period. A power saving state can be called as a sleeping state or in a sleeping mode. In addition, the power saving state can include multiple states with different levels of power saving capabilities.

In addition, for a UE, there can be other states in addition to the active state and the power saving state. In addition, the active state or the power saving state is defined with respect to monitoring SL control channels for messages from other UEs. When a UE is in a power saving state for RX, the UE can still perform other communication or computation activities without listening to the control channel of SL communication. For example, UE may choose to perform some transmission. A state may also be referred to as a mode. The term listen is used interchangeably with monitor, channel sensing, or carrier sensing.

According to some aspects, a UE can know the DRX cycle of a receiver UE in advance. For example, the DRX cycle and the sidelink on-duration period of a UE can be configured by radio resource control (RRC) level signaling. In order to perform paging operations to send a message to the receiver UE, the UE determines the DRX cycle of the receiver UE, and further determines the sidelink on-duration period within the DRX cycle for the receiver UE. Accordingly, the UE sends a message to the receiver UE during one or more slots of the sidelink on-duration period when the receiver UE is in the active state. In this way, direct communication between the UE and the receiver UE can be accomplished without any preexisting connections between the two UEs, and without the receiver UE listening to the control channel of SL communication all the time. One way to ensure this common understanding of DRX configuration is to only allow a single DRX configuration in the system and indicated in RRC signaling for the whole cell. However, this may not for the best interest of all UEs, as different UEs may desire different DRX configurations. To ensure a transmitter UE and a receiver UE, without prior connection, are aligned on the understanding of the DRX configuration is used by the receiver UE with a DRX cycle, the DRX configurations can be defined based on different sidelink addresses. So that if a UE wants to transmit a SL message to a certain address, it can derive the DRX cycle configuration based on the destination address to be used. When there are multiple receiver UEs in SL communication with the UE, the DRX cycles of the multiple receiver UEs can be designed to be the same, or with some correlations so that the UE can find one or more common slots to send one-to-many messages to the multiple receiver UEs at the same one or more slots. Accordingly, a UE can perform paging operations in SL communication with reduced power consumptions for the UEs compared to any existing solutions.

The UEs disclosed herein can operate in a wireless communication system based on 3rd Generation Partnership Project (3GPP) release 16 (Rel-16), release 17 (Rel-17), or a New Radio (NR) system. However, these 3GPP release version are not meant to be limiting. Although some examples of the contents of SL communication among multiple UEs are provided above, the aspects of this disclosure are not limited to these examples and SL communication among multiple UEs can include less, more, or other parameters, instructions, and/or information.

FIG. 1 illustrates an example wireless system 100 implementing designs for sidelink communications among multiple UEs, according to some aspects of the disclosure. The wireless system 100 is provided for the purpose of illustration only and does not limit the disclosed aspects. The system 100 can include, but is not limited to, a network node (herein referred to as a base station) 101 and multiple UEs, e.g., a UE 102, a UE 103, a UE 104, a UE 106, a UE 108.

According to some aspects, the base station 101 can include a node configured to operate based on a wide variety of wireless communication techniques such as, but not limited to, techniques based on 3GPP standards. For example, base station 101 can include a node configured to operate using Rel-16, Rel-17, or later. The base station 101 can be a fixed station, and may also be called a base transceiver system (BTS), an access point (AP), a transmission/reception point (TRP), an evolved NodeB (eNB), a next generation node B (gNB), or some other equivalent terminology. The system 100 can operate using both licensed cellular spectrum (known as in-band communication) and unlicensed spectrum (known as out-band communication).

According to some aspects, a UE, e.g., the UE 102, the UE 103, the UE 104, the UE 106, or the UE 108, can be configured to operate based on a wide variety of wireless communication techniques. These techniques can include, but are not limited to, techniques based on 3rd Generation Partnership Project (3GPP) standards. For example, referring to FIG. 1, the UE 102 can be configured to operate using Rel-16, Rel-17 or later. The UE 102, the UE 103, the UE 104, the UE 106, or the UE 108, can include, but is not limited to, a wireless communication device, a smart phone, a laptop, a desktop, a tablet, a personal assistant, a monitor, a television, a wearable device, an Internet of Things (IoTs), a vehicle's communication device, a mobile station, a subscriber station, a remote terminal, a wireless terminal, a user device, or the like.

According to some aspects, the base station 101 communicates with the multiple UEs within a coverage area 111, e.g., the UE 102, the UE 104, the UE 103, while the UE 106 and the UE 108 are outside the coverage area 111. Among them, the UE 103 is a relay UE. A UE within the coverage area 111, e.g., the UE 102, communicates with the base station 101 in uplink (UL) and downlink (DL) through a communication interface, e.g., a Uu interface.

According to some aspects, a UE can perform SL communication with another UE. For example, the UE 102 can perform SL communication with the UE 104, the UE 106, and the UE 108. The UE 104 is an in-coverage UE with respect to the UE 102 and the base station 101 since both the UE 102 and the UE 104 are within the coverage area 111 of the base station 101. The UE 106 is a partial-coverage UE with respect to the UE 102 and the base station 101 since the UE 106 is outside the coverage area 111 but the UE 102 is within the coverage area 111 and operates a link 112 with the UE 102. Furthermore, the UE 106 can perform SL communication with the UE 108, where both the UE 106 and the UE 108 are an out-of-coverage UE since both the UE 106 and the UE 108 are out of the coverage area 111 of the base station 101.

According to some aspects, a UE can perform SL communication with another UE over a SL link through an interface, e.g., PC5 interface, which is different from the interface between the UE and the base station. The interface for SL communication between UEs can support one-to-many and/or any-to-any communication between a group of UEs. For example, the UE 102 and the UE 106 can communicate over the link 112 through the PC5 interface. A SL link, e.g., the link 112, is identified by a pair of layer two (L2) addresses. For example, the link 112 is identified by a L2 address 122 stored in the UE 102, and a L2 address 123 stored in the UE 106. Hence, a UE can be associated with multiple L2 addresses based on the number of links the UE can form with other UEs. A message can be sent from UE 102 to UE 106 using SL communication by a broadcast transmission, a groupcast transmission, or a unicast transmission.

According to some aspects, a UE can perform SL communication with another UE for various applications. For example, the UE 102 can perform SL communication with the UE 106 for public safety use or commercial application, to provide data offloading facility that can reduce the overall network overhead, for indoor installation and positioning, for machine type communication (MTC), or more. The UE 102 can perform vehicle-to-vehicle (V2V) communication and vehicle-to-everything (V2X) communication with the UE 106 by SL communication. For example, the UE 102 and the UE 106 can be two vehicles. The UE 102 can be a vehicle running at high speed that warns the UE 106, which is a nearby vehicle, using the link 112 before it changes highway lanes.

A sidelink-based paging operation among the group of UEs, e.g., the UE 102, the UE 104, the UE 103, the UE 106 and the UE 108, can be difficult to implement. A UE can constantly listen or monitor a control channel of SL communication, e.g., a Physical Sidelink Control Channel (PSCCH) in a PC5 interface, for paging messages. However, the UE can consume much power when listening all the time for paging messages. Embodiments herein provide solutions for SL communication, e.g., paging operation, among multiple UEs with reduced power consumption. Operations disclosed in the current disclosure are not limited to paging message or paging operation among UEs. Instead, operations and embodiments are applicable to any communications, signaling or data to be transmitted among a group of UEs that can be in a power saving mode and not able to receive sidelink messages including the paging message.

Figure 2A:
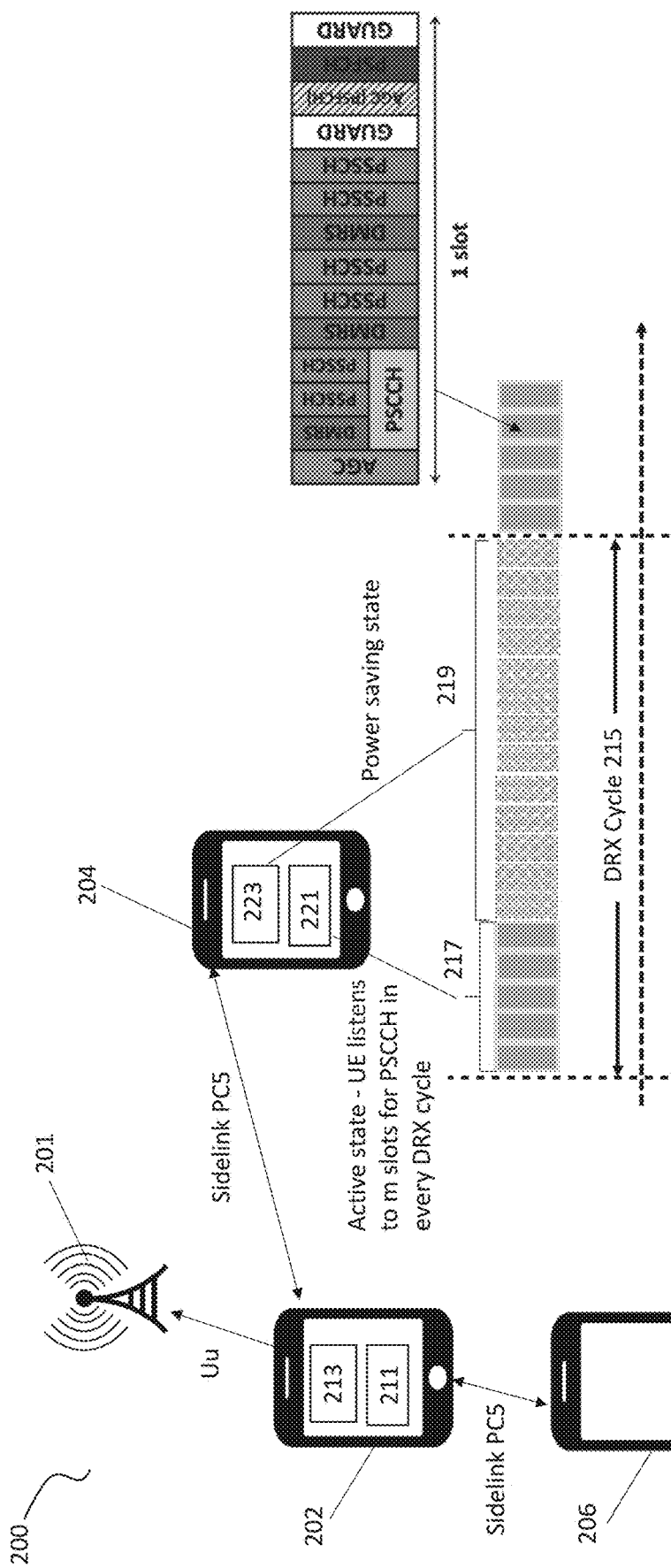
Figure 2C:
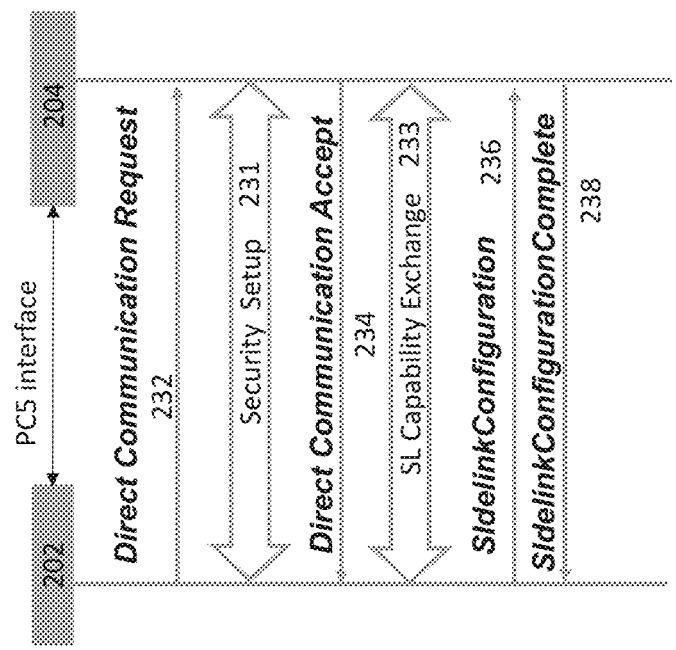

FIGS. 2A-2C illustrate an example wireless system 200 including multiple UEs operating according to DRX cycles containing sidelink on-duration periods for SL communications, according to some aspects of the disclosure. FIGS. 2A-2C illustrate an example wireless system 200 including a base station 201 and multiple UEs, e.g., a UE 202, a UE 204, a UE 206, operating according to a DRX cycle containing a sidelink on-duration period. The wireless system 200 can be an example of the wireless system 100 as shown in FIG. 1. Similarly, the base station 201, the UE 202, the UE 204, the UE 206 can be examples of the base station 101, the UE 102, the UE 103, the UE 104, the UE 106, or the UE 108, respectively, as shown in FIG. 1.

Figure 6:
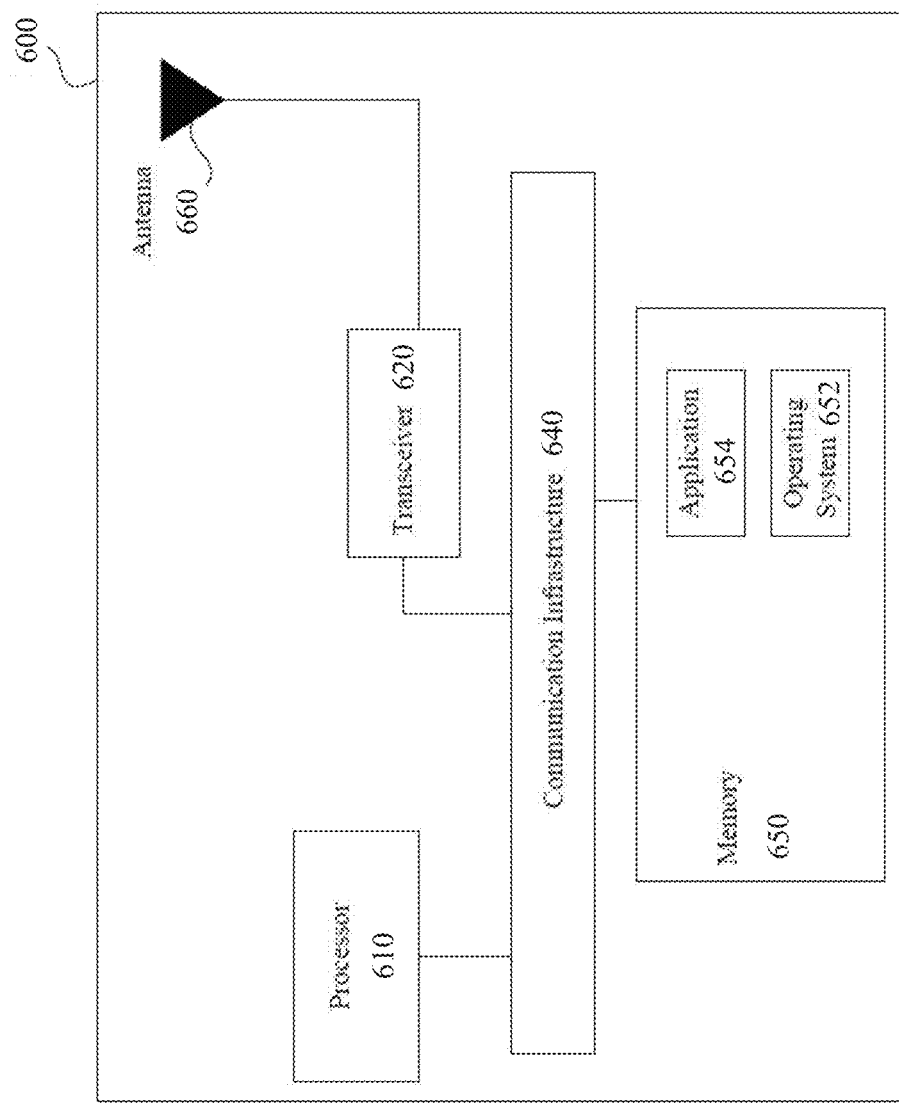
FIG. 6 illustrates a block diagram of an example system of an electronic device implementing designs for sidelink communications among multiple UEs, according to some aspects of the disclosure.
Figure 7:
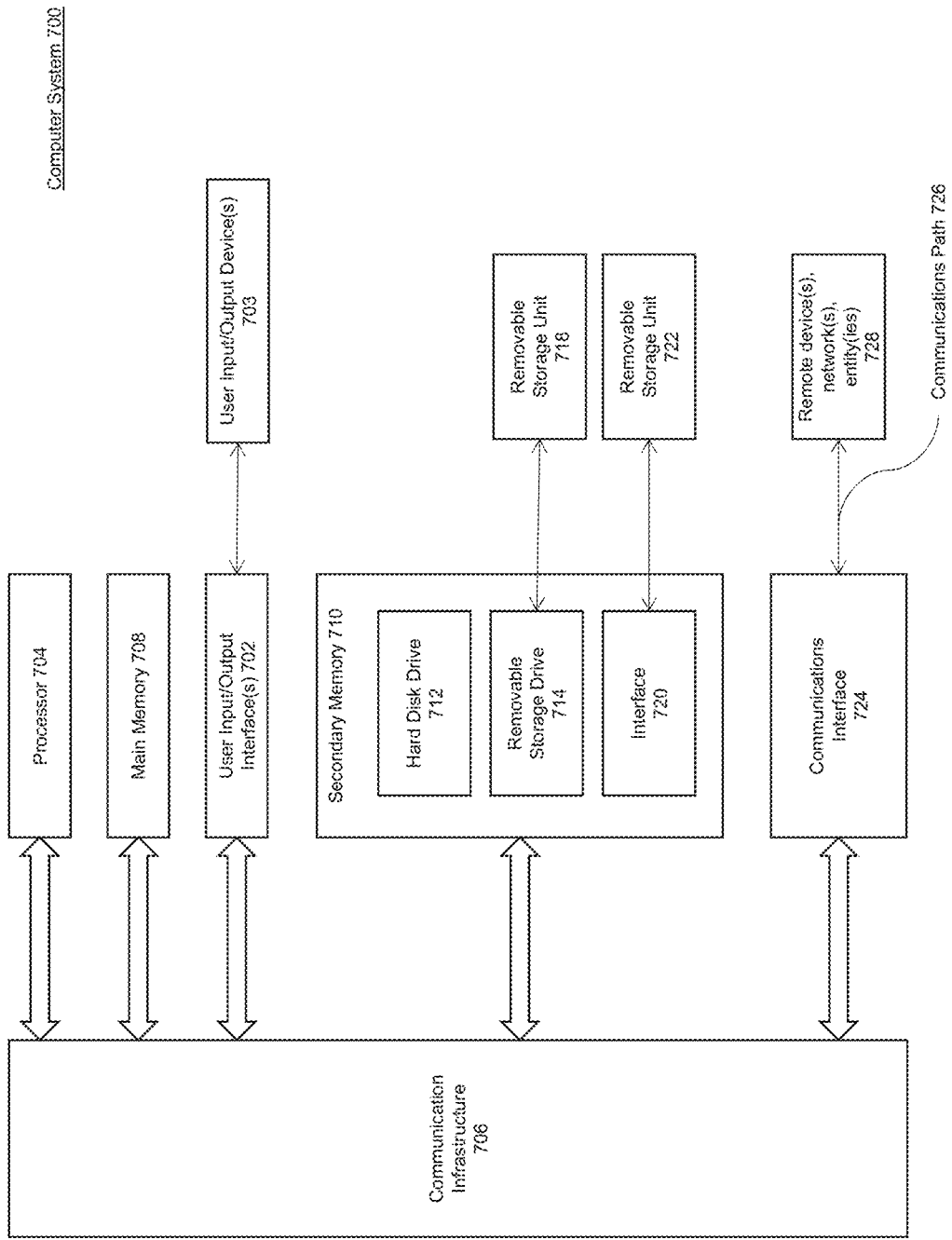
FIG. 7 is an example computer system for implementing some aspects or portion(s) thereof of the disclosure provided herein.

In some examples, the UE 202 can include a transceiver 211 and a processor 213 communicatively coupled to the transceiver 211 as shown in more details in FIGS. 6 and 7. The transceiver 211 is configured to wirelessly communicate through an interface, e.g., a PC5 interface, for SL communication with one or more UEs, e.g., the UE 204, and the UE 206. When the UE 202 sends a message by SL communication to the UE 204, the UE 202 is the sender UE and the UE 204 is the receiver UE. In some examples, the interface for SL communication can be a one-to-one or one-to-many interface for the multiple UEs. Furthermore, the UE 202 can be configured to wirelessly communicate with the base station 201 through an interface supporting uplink and downlink transmissions between the base station 201 and the UE 202, e.g., a Uu interface that is part of the transceiver 211 or another transceiver.

In some examples, a UE can be in different states to save power. For example, the UE 204 can be in an active state 221 or a power saving state 223. A UE can periodically change from one state to another during a DRX cycle. The UE 204 has a DRX cycle 215 includes a first number of slots. The UE 204 can have a sidelink on-duration period 217 within the DRX cycle 215. During the sidelink on-duration period 217, the UE 204 is in the active state 221 to listen to a PSCCH for SL communication. In some examples, the PSCCH may only occupy a few symbols of a slot. As shown in FIG. 2A, the PSCCH occupies only 3 symbols of total 14 symbols of a slot. The sidelink on-duration period 217 includes a second number of slots that is less than the first number of slots of the DRX cycle 215. In some examples, the second number of slots can be larger than one slot, when groupcast is allowed. If the sidelink on-duration period 217 of the UE 204 contains only one slot, it can post a challenge for multiple UEs to send messages to the UE 204. In some examples, the second number of slots within the sidelink on-duration period 217 are multiple consecutive slots. However, in some examples, the second number of slots can be one slot, when physical layer slot design can be employed to allow concurrency within a single slot.

In some examples, the DRX cycle 215 further includes a third number of slots 219 when the UE 204 is in the power saving state 223. The UE 204 does not listen to PSCCH when the UE 204 is in the power saving state 223, hence power consumption can be saved for the UE 204. The UE 204 can operate according to the DRX cycle 215 to alternate between the active state 221 during the sidelink on-duration period 217 and the power saving state 223 during the third number of slots 219, without maintaining a PC5 RRC connection state.

For the UE 204, there can be other states in addition to the active state 221 and the power saving state 223. In addition, the active state 221 or the power saving state 223 is defined with respect to monitoring SL control channels for messages from other UEs. When a UE is in a power saving state, the UE can still perform other communication or computation activities without listening to the control channel of SL communication. Other UEs, e.g., the UE 202, the UE 206 can operate in a similar fashion with respect to the active state, the power saving state, the DRX cycle, and the sidelink on-duration period, as described for the UE 204.

In some examples, within the UE 202, the processor 213 can perform various operations to send a message, e.g., a paging message, to the UE 204, which is referred to as the receiver UE. The UE 204 can be an in-coverage UE, an out-of-coverage UE, or a partial-coverage UE, with respect to the UE 202 and the base station 201. In detail, the processor 213 is configured to determine the DRX cycle 215 and the sidelink on-duration period 217 of the UE 204. The DRX cycle 215 and the sidelink on-duration period 217 of the UE 204 can be determined by RRC signaling provided by the base station 201. For example, the base station 201 can enable or disable DRX cycles for all of the UEs or on individual basis so that the DRX cycles are disabled for some of the UEs. Furthermore, the base station 201 can make the DRX cycle configurations of the UE 204 to be known to the UE 202. In addition, the UEs can be configured in other ways, e.g., by user programming, to provide information about DRX cycles of other UEs.

In some examples, the UE 204 can receive a configuration for the DRX cycle 215 having the sidelink on-duration period 217 within the DRX cycle 215. Such a configuration information can be received from the base station 201 by RRC signaling. The UE 204 is in the active state 221 during the sidelink on-duration period 217, and the UE 204 is in the power saving state 223 outside the sidelink on-duration period 217. Hence, the UE 204 can enter the power saving state 223 by itself, and also bring itself out of the power saving state 223. In the active state 221, the UE 204 listens to a PSCCH during at least one slot within the sidelink on-duration period 217 for a message from the UE 202. By using the DRX cycle 215 and the sidelink on-duration period 217, the UE 204 can be synchronized with the UE 202, or any other UEs, which wants to send a message to the UE 204. During the synchronization of the UE 202 and the UE 204, a time reference can be shared between the UE 202 and the UE 204. The time reference can serve as the starting point of the DRX cycle 215 and the sidelink on-duration period 217.

In some examples, the UE 204 can have multiple different configurations, which can be provided from the base station 201 by RRC signaling. If multiple DRX cycles are permitted and configured for the UE 204, the UE 204 can choose which DRX cycle to follow. The UE 204 can choose a DRX cycle based on the type of SL service provided to the UE 204. For example, when the UE 204 is engaged in SL communication for V2X services, the UE 204 can choose a shorter DRX cycle due to the potential high speed of vehicles. The UE 204 can also choose the DRX cycle based on quality of service (QoS) profiles including priority, packet delay budget of the SL communications, or other QoS factors. If a UE is engaged with multiple sidelink-based services and each service is associated with a different sidelink DRX cycle configuration, then the UE can be in the active state in the on-duration periods configured for each of those different services, respectively. In this case, the UE can be in the active state and receive a PSCCH in all those on-duration periods configured in different DRX cycle configurations. In some embodiments, the multiple DRX cycle configurations via RRC signaling can be configured in a way that the on-duration periods of those DRC cycles overlap so that the UE can be in the active for multiple services, hence reducing the time for the UE to be in the active state. For example, when the multiple DRX cycles share a common offset with respect to a time reference, while having various DRX cycle lengths of the form T, 2T, 4T . . . $2^n$*T, the UE can choose to be in the active state in a slot that is shared among all of the on-durations of the DRX cycles.

After determining the DRX cycle 215 and the sidelink on-duration period 217 of the UE 204, the processor 213 of the UE 202 can send a message, using the transceiver 211, to the UE 204 during one or more slots of the sidelink on-duration period 217. The message can be sent to the UE 204 by a broadcast transmission, a groupcast transmission, or a unicast transmission. The UE 202 can send and the UE 204 can receive the message through the PC5 interface for SL communication. In some examples, the message to the UE 204 can be carried in a sidelink medium access control (MAC) Control Element (MAC CE), and include a configuration to define one or more slots for the UE 204 to respond to the UE 202. Hence, the UE 204 can determine, based on the received message, a configuration that defines one or more slots for the UE 204 to respond to the UE 202. Afterwards, the UE 204 sends a response message to the UE 202 based on the determined configuration.

For example, as shown in more details in FIG. 2B, the UE 202 sends a message at a slot 216 contained in the sidelink on-duration period 217 within the DRX cycle 215 of the UE 204. The message includes a configuration to define one or more slots, e.g., a slot 218, for the UE 204 to respond to the UE 202. Accordingly, the UE 204 sends a response message to the UE 202 at the slot 218.

In some examples, there can be multiple message exchanges between the UE 204 and the UE 202, as shown in FIG. 2C. For example, the UE 202 can send a message 232 to the UE 204 to request to establish a direct communication between the UE 202 and the UE 204. The UE 204 can respond with a message 234 to indicate the acceptance of the request to establish a direct communication with the UE 202. Afterwards, the UE 202 can send a message 236 to the UE 204 to indicate a configuration for SL communication. Furthermore, the UE 204 can respond with a message 238 to the UE 202 to indicate the configuration for SL communication is completed. In addition, there can be various security setup messages 231 exchanged between the UE 202 and the UE 204. The UE 202 and the UE 204 can also exchange messages 233 to indicate the capacity for SL communication between them. Some or all of the messages, e.g., the message 232, the message 234, the message 236, the message 238, the message 231, the message 233, can be exchanged when the UE 204 is in the active state 221, as indicated by the sidelink on-duration period 217 within the DRX cycle 215.

In addition, as shown in FIG. 2A, the UE 202 can perform SL communication with the UE 206 at the same time with the UE 204, so that the SL communication is a broadcast transmission or a groupcast transmission. In detail, the processor 213 is further configured to determine a DRX cycle for the UE 206 and a sidelink on-duration period within the DRX cycle for the UE 206. The UE 206 is in an active state to listen to the PSCCH during the sidelink on-duration period. Furthermore, the processor 213 determines one or more slots when the UE 202 and the UE 204 are both in the active state. Afterwards, the processor 213 can send a message, using the transceiver 211, to the UE 204 and the UE 206 in a one-to-many communication during the one or more slots when the UE 204 and the UE 206 are both in the active state.

When there are multiple receiver UEs in SL communication with the UE 202, the DRX cycles of the multiple receiver UEs can be designed to be the same, or with some correlations so that the UE 202 can find one or more common slots to send one-to-many messages to the multiple receiver UEs at the same one or more slots. More details are illustrated in FIGS. 3A-3C.

Figure 3A:
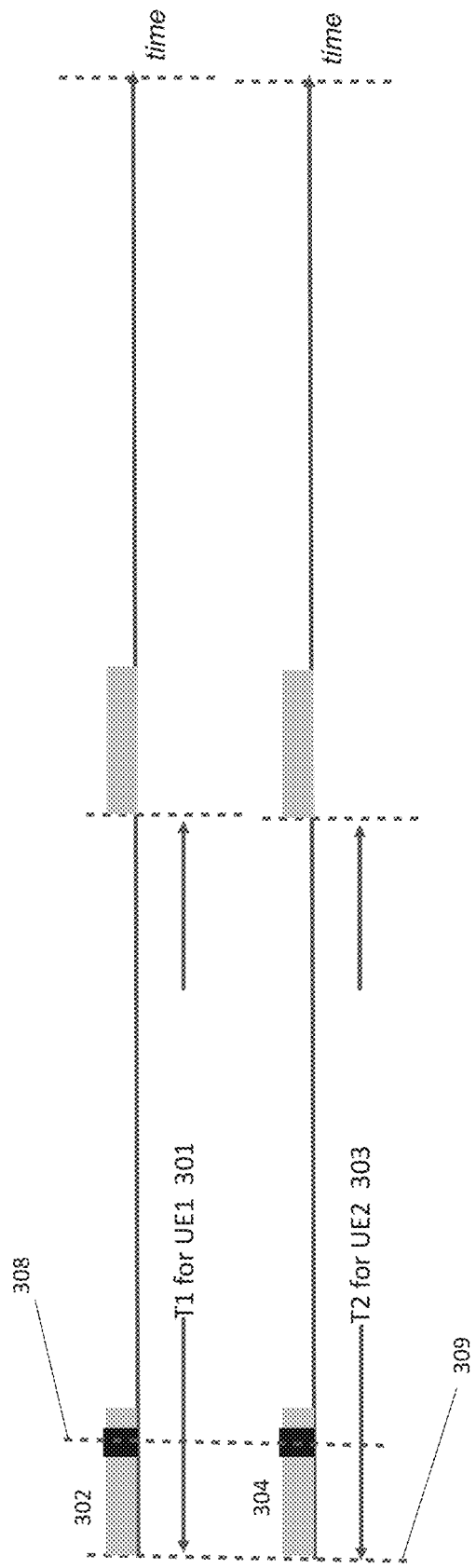
FIGS. 3A-3C illustrates example DRX cycles with sidelink on-duration periods for sidelink communications among multiple UEs, according to some aspects of the disclosure.
Figure 3B:
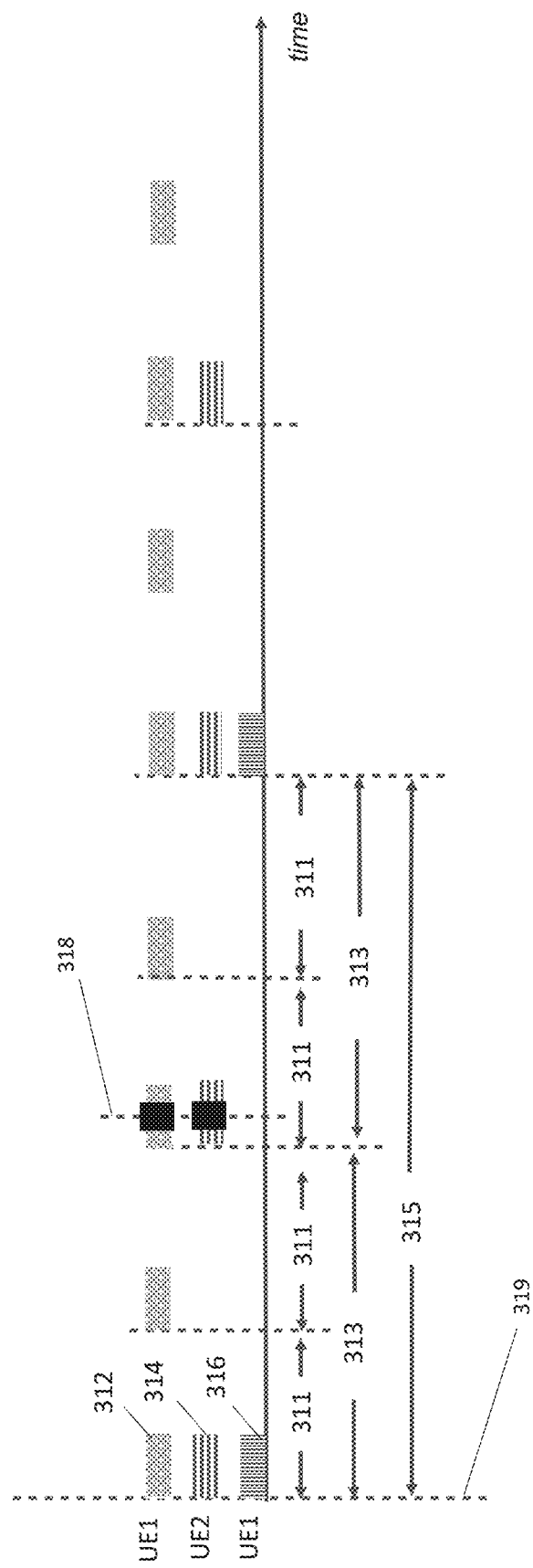
Figure 3C:
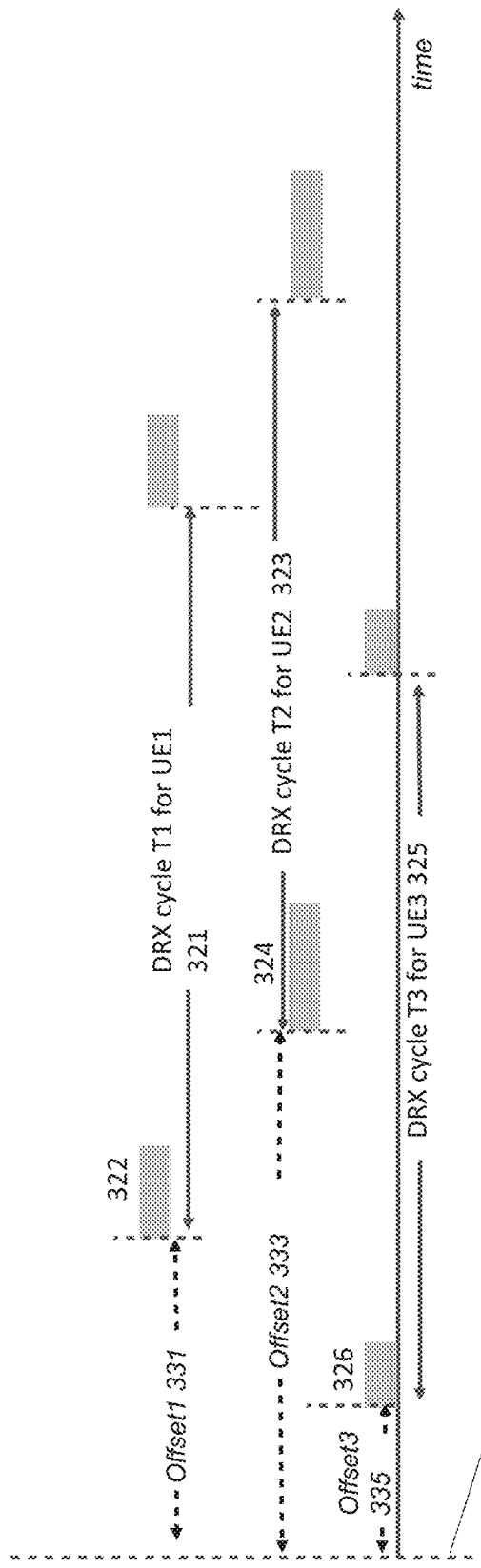

FIGS. 3A-3C illustrates example DRX cycles with sidelink on-duration periods for sidelink communications among multiple UEs, according to some aspects of the disclosure.

In some examples, FIG. 3A illustrates two DRX cycles, a DRX cycle 301 for a first UE, and a DRX cycle 303 for a second UE. The first UE and the second UE can be the UE 204 and the UE 206 to communicate with the UE 202, as shown in FIG. 2A. In addition, the DRX cycle 301 includes a first sidelink on-duration period 302, and the DRX cycle 303 includes a second sidelink on-duration period 304. The DRX cycle 301 and the DRX cycle 303 can be the same time period with respect to a time reference 309 that is shared by both UEs. In addition, the first sidelink on-duration period 302 can be the same time period as the second sidelink on-duration period 304 with respect to the timing reference 309.

In some examples, FIG. 3B illustrates three DRX cycles, a DRX cycle 311 for a first UE, a DRX cycle 313 for a second UE, and a DRX cycle 315 for a third UE, with respect to a timing reference 319. The first UE, the second UE, and the third UE can be the UE 204, the UE 206, and the UE 202, as shown in FIG. 2A. In addition, the DRX cycle 311 includes a first sidelink on-duration period 312, the DRX cycle 313 includes a second sidelink on-duration period 314, and the DRX cycle 315 includes a third sidelink on-duration period 316. The DRX cycle 315 has a length of X slots, the DRX cycle 313 can have a length of X/2 slots, while the DRX cycle 311 can have a length of X/4 slots. The lengths of X/2 and X/4 are shown for examples only. Other fractions, e.g., X/3, X/9, or more, can be used as well. In some examples, the first sidelink on-duration period 312, the second sidelink on-duration period 314, and the third sidelink on-duration period 316 can have a same length. In some other examples, the first sidelink on-duration period 312, the second sidelink on-duration period 314, and the third sidelink on-duration period 316 can have different lengths.

In some examples, FIG. 3C illustrates three DRX cycles, a DRX cycle 321 for a first UE, a DRX cycle 323 for a second UE, and a DRX cycle 325 for a third UE. Instead of starting from a same timing reference 329, the DRX cycle 321, the DRX cycle 323, and the DRX cycle 325 can have different offsets with respect to the timing reference 329. The DRX cycle 321 has an offset 331 with respect to the timing reference 329, the DRX cycle 323 has an offset 333 with respect to the timing reference 329, and the DRX cycle 325 has an offset 335 with respect to the timing reference 329, where the offset 331, the offset 333, and the offset 335 can be different from each other. In addition, the DRX cycle 321 includes a first sidelink on-duration period 322, the DRX cycle 323 includes a second sidelink on-duration period 324, and the DRX cycle 325 includes a third sidelink on-duration period 326. The DRX cycle 325, the DRX cycle 323, and the DRX cycle 321 can have a same length or different lengths. Similarly, the first sidelink on-duration period 322, the second sidelink on-duration period 324, and the third sidelink on-duration period 326 can have a same length or different lengths.

The three different approaches shown in FIGS. 3A-3C for defining DRX cycles with sidelink on-duration periods can have various characteristics and performance when applied in SL communication among multiple UEs. The following Table 1 provides a short summary of the comparisons.

TABLE 1

| | DRX cycles in FIG. 3C | DRX cycles in FIGS. 3A-3B |
|---|---|---|
| DRX cycle determination | Directly configured in RRC based on service identifier or QoS (allowing a base station to enable/disable DRX) | |
| Sidelink on-duration period distribution | Can be evenly distributed in time domain | DRX on durations concentrated on a short time span |
| Number of DRX periods engaged by UE | Depending on # of RX addresses or services, or different QoS profiles | Only 1 |
| Resource selection for TX in DRX period | Dynamic scheduling based on sensing | Random selection among resource candidates |
| Messages transported in DRX period | Any message destination to receiver address | Paging-specific short message. Paging resource are dimensioned to maximize availability and reduce collision (e.g. single sub-channel) |
| Dedicated Usage | Mixed with other V2X traffic from other UEs | Can be configured to only allow DRX wake-up/Paging messages |
| Interference control | Interfered by all other SL traffic overlapping in time | Interfered by SL transmissions for R16 UEs |
| Power efficiency | Depends on how many RX address UE listens | High |
| RAN2 work load | Light | Light if not designing new SL paging messages |

Figure 4:
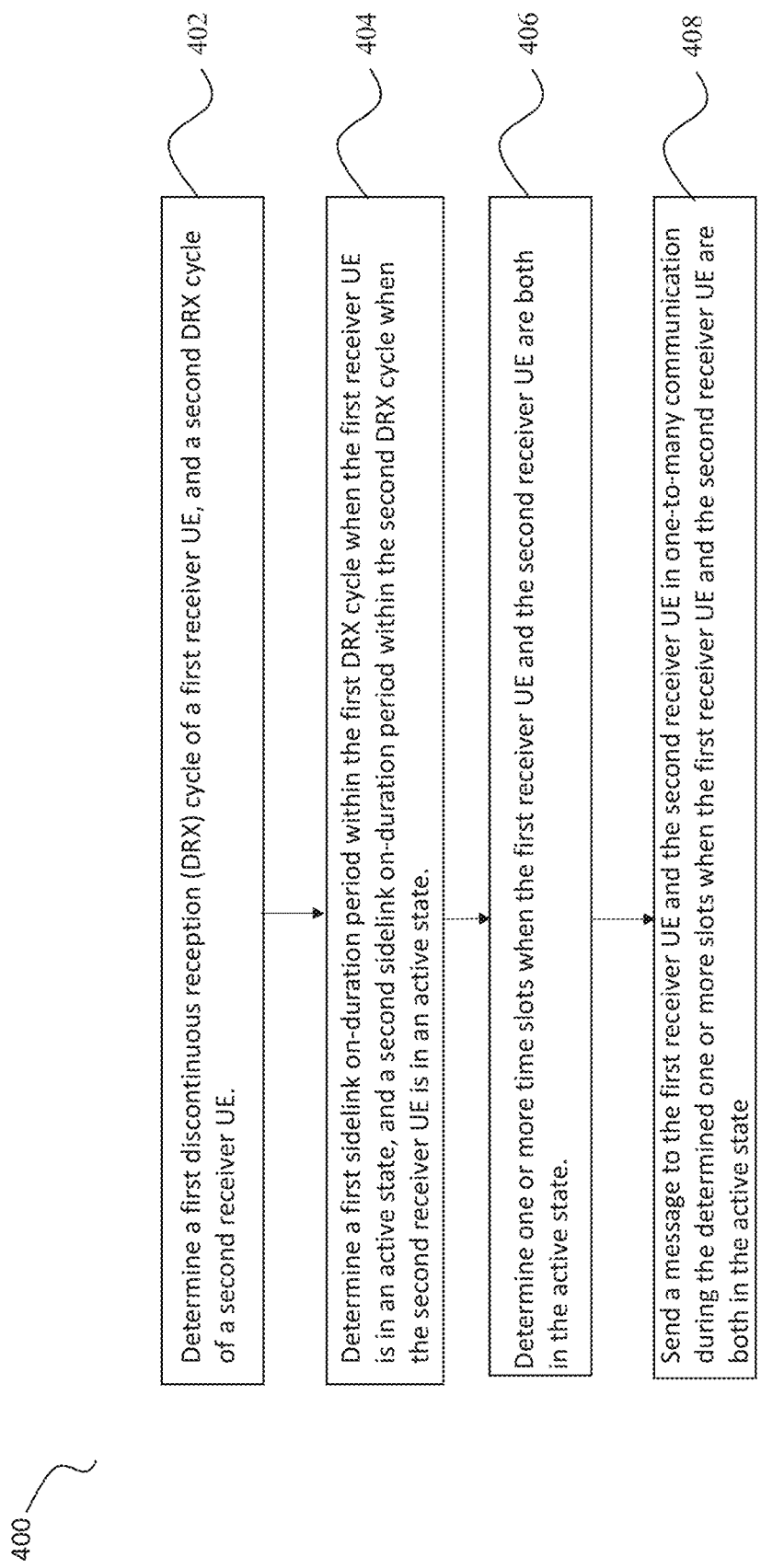
FIG. 4 illustrates an example method for a device supporting sidelink communications among multiple UEs, according to some aspects of the disclosure.

FIG. 4 illustrates an example method 400 for a device supporting sidelink communications among multiple UEs, according to some aspects of the disclosure. As a convenience and not a limitation, FIG. 4 can be described with regard to elements of FIGS. 1, 2A, 6, and 7. The method 400 may represent the operation of an electronic device (for example, the UE 102, the UE 103, the UE 104, the UE 106, the UE 108 of FIG. 1, the UE 202, the UE 204, or the UE 206 of FIG. 2A) implementing mechanisms for supporting sidelink communications among multiple UEs. The method 400 may also be performed by the system 600 of FIG. 6 and/or the computer system 700 of FIG. 7. But the method 400 is not limited to the specific aspects depicted in those figures and other systems may be used to perform the method as will be understood by those skilled in the art. It is to be appreciated that not all operations may be needed, and the operations may not be performed in the same order as shown in FIG. 4.

At 402, a UE determines a first DRX cycle of a first receiver UE, and a second DRX cycle of a second receiver UE, where the first receiver UE and the second receiver UE are among a group of UEs that wirelessly communicate with the UE for sidelink communication. For example, as described for FIG. 2A, the UE 202 determines a first DRX cycle of the UE 204, and a second DRX cycle of the UE 206. The first DRX cycle and the second DRX cycle can be the DRX cycle 301 and the DRX cycle 303 as shown in FIG. 3A, the DRX cycle 311 and the DRX cycle 313 as shown in FIG. 3B, or the DRX cycle 321 and the DRX cycle 323 as shown in FIG. 3C.

At 404, a UE determines a first sidelink on-duration period within the first DRX cycle when the first receiver UE is in an active state, and a second sidelink on-duration period within the second DRX cycle when the second receiver UE is in an active state. For example, as described for FIG. 2A, the UE 202 determines a first sidelink on-duration period within the first DRX cycle of the UE 204, and a second sidelink on-duration period within the second DRX cycle of the UE 206. The first sidelink on-duration period and the second sidelink on-duration period can be the sidelink on-duration period 302 and the sidelink on-duration period 304 as shown in FIG. 3A, the sidelink on-duration period 312 and the sidelink on-duration period 314 as shown in FIG. 3B, or the sidelink on-duration period 322 and the sidelink on-duration period 324 as shown in FIG. 3C.

At 406, a UE determines one or more slots when the first receiver UE and the second receiver UE are both in the active state. For example, the UE 202 determines one or more slots when the first receiver UE and the second receiver UE are both in the active state, as described for FIG. 2A. Such one or more slots can be any slots shared by the sidelink on-duration period 302 and the sidelink on-duration period 304 as shown in FIG. 3A, or the sidelink on-duration period 312 and the sidelink on-duration period 314 as shown in FIG. 3B. In the event when there is no shared slot between the sidelink on-duration period 322 and the sidelink on-duration period 324 as shown in FIG. 3C, the UE can select two separated slots, one slot within the sidelink on-duration period 322, and another slot within the sidelink on-duration period 324.

At 408, a UE sends a message to the first receiver UE and the second receiver UE in a one-to-many communication during the determined one or more slots. For example, the UE 202 can send a message in one or more slots, e.g., a time slot 308, shared by the sidelink on-duration period 302 and the sidelink on-duration period 304 as shown in FIG. 3A, or one or more slots, e.g., a time slot 318, shared by the sidelink on-duration period 312 and the sidelink on-duration period 314 as shown in FIG. 3B. In the event when there is no shared slot between the sidelink on-duration period 322 and the sidelink on-duration period 324 as shown in FIG. 3C, the UE can send the message in two different slots in one-to-one fashion, one slot within the sidelink on-duration period 322, and another slot within the sidelink on-duration period 324.

The method 400 illustrated above is for sending a message to two receiver UEs. Similar methods can be developed for sending a message to one receiver UE, or more than two receiver UEs, based on the determination of the DRX cycle and the sidelink on-duration period of the receiver UE. There can be additional operations, not shown in the method 400, performed by the UE before or after sending a message to the first receiver UE and the second receiver UE. For example, the UE can perform resource selection operations to select the resource to send the message to the receiver UEs. The resource for carrying the message can be selected by random selection algorithms or by dynamical scheduling based on sensing, as shown in Table 1.

Figure 5A:
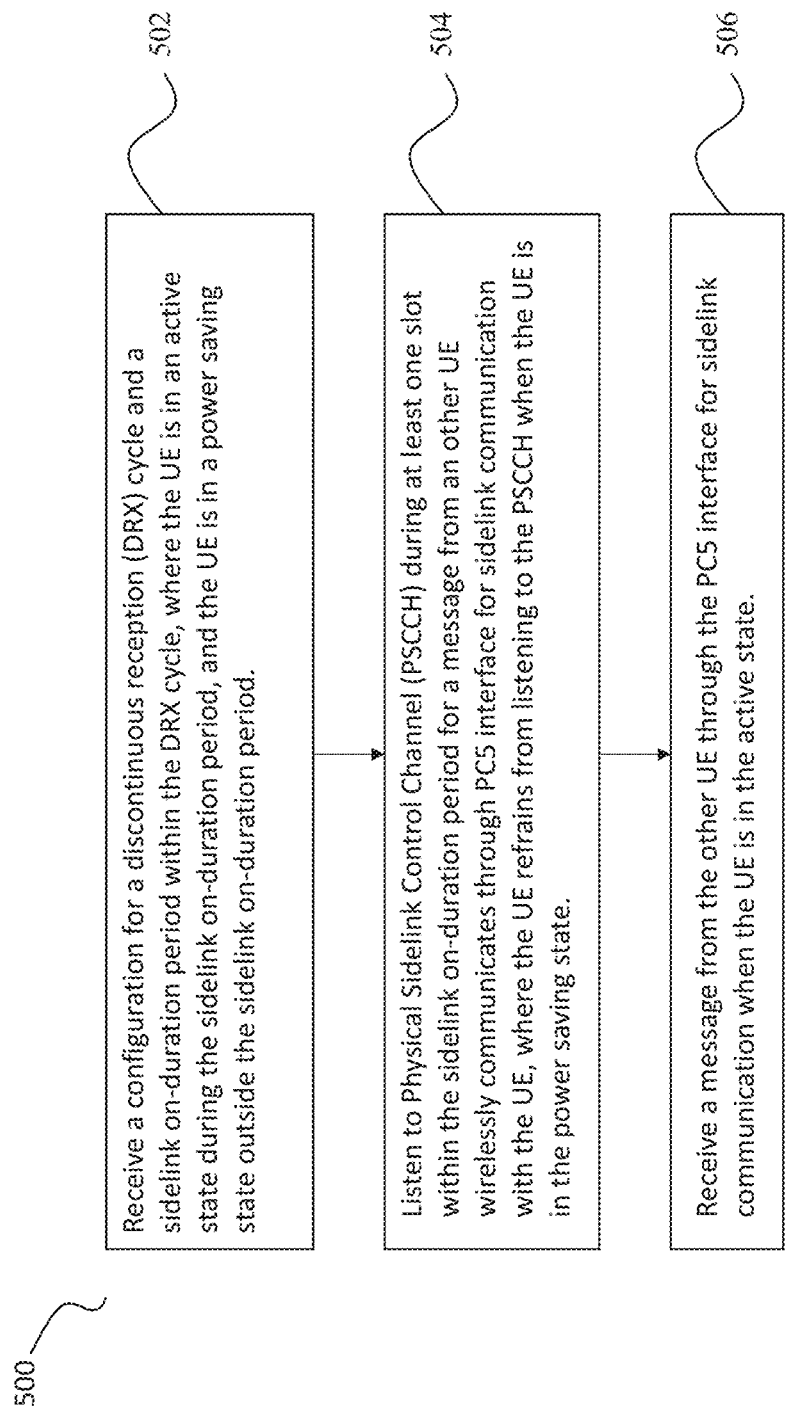
FIGS. 5A-5B illustrate example methods for a device supporting sidelink communications among multiple UEs, according to some aspects of the disclosure.
Figure 5B:
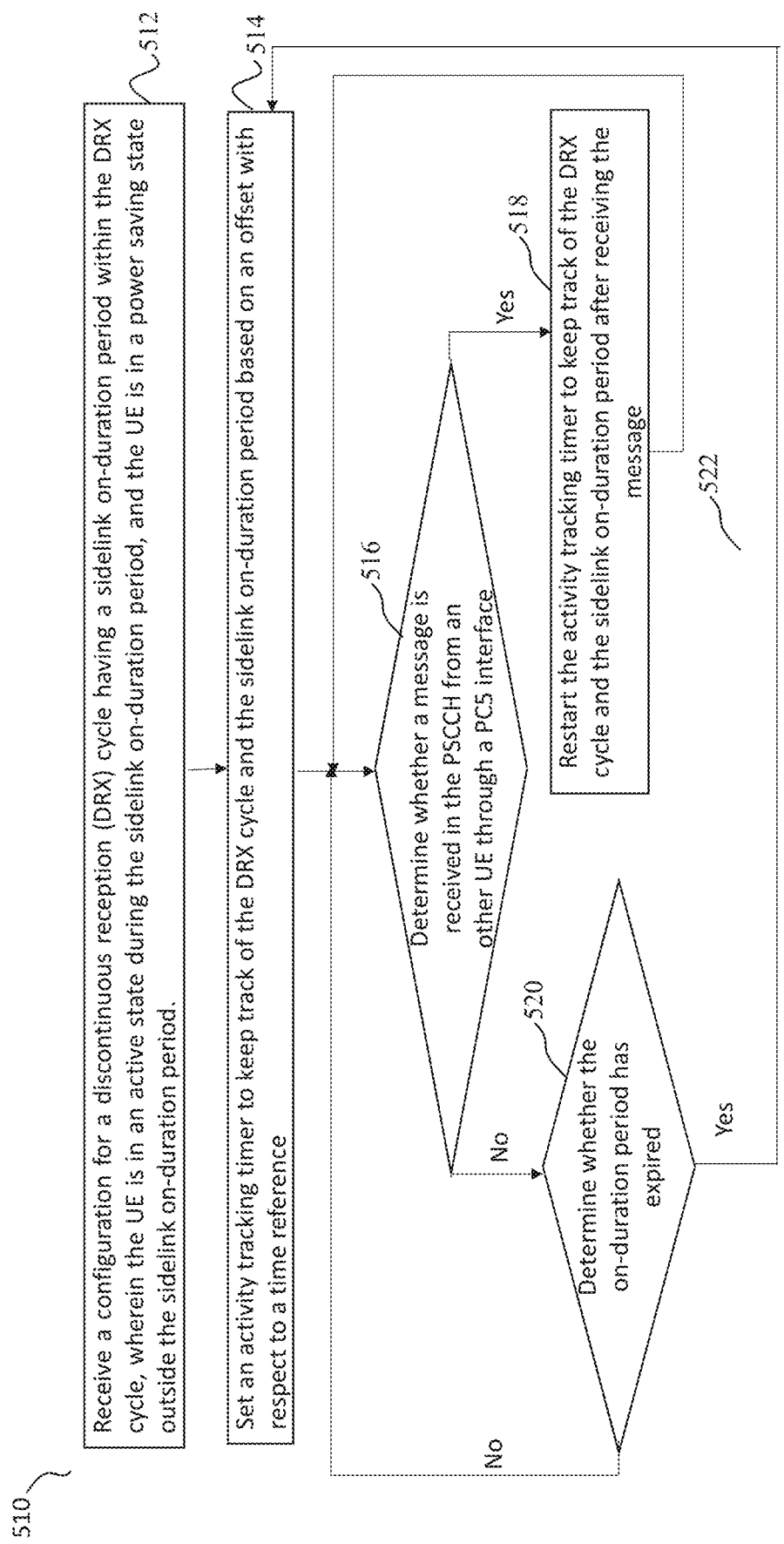

FIGS. 5A-5B illustrate example methods, a method 50) and a method 510, for a device supporting sidelink communications among multiple UEs, according to some aspects of the disclosure. As a convenience and not a limitation, FIGS. 5A-5B may be described with regard to elements of FIGS. 1, 2A, 6, and 7. The method 500 and the method 510 can represent the operation of an electronic device (for example, the UE 102, the UE 103, the UE 104, the UE 106, the UE 108 of FIG. 1, the UE 202, the UE 204, or the UE 206 of FIG. 2A) implementing mechanisms for supporting sidelink communications among multiple UEs. The method 500 and the method 510 can also be performed by the system 600 of FIG. 6 and/or the computer system 700 of FIG. 7. But the method 500 and the method 510 are not limited to the specific aspects depicted in those figures and other systems may be used to perform the method as will be understood by those skilled in the art. It is to be appreciated that not all operations may be needed, and the operations may not be performed in the same order as shown in FIGS. 5A-5B.

As shown in FIG. 5A, at 502, a UE receives a configuration for a DRX cycle having a sidelink on-duration period within the DRX cycle, where the UE is in an active state during the sidelink on-duration period, and the UE is in a power saving state outside the sidelink on-duration period. For example, as shown in FIG. 2A, the UE 204 receives a configuration for the DRX cycle 215 having the sidelink on-duration period 217 within the DRX cycle 215. The UE 204 is in the active state 221 during the sidelink on-duration period 217, and the UE is in the power saving state 223 outside the sidelink on-duration period 217, as described for FIG. 2A.

At 504, a UE listens to a PSCCH during at least one slot within the sidelink on-duration period for a message from an other UE that wirelessly communicates through a PC5 interface for sidelink communication with the UE, while the UE refrains from listening to PSCCH when the UE is in the power saving state. For example, as described for FIG. 2A, the UE 204 listens to a PSCCH during at least one slot within the sidelink on-duration period 217 for a message from the UE 202 that wirelessly communicates through a PC5 interface for sidelink communication with the UE 204. The UE 204 refrains from listening to the PSCCH when the UE 204 is in the power saving state 223. For example, the UE 204 does not listen, or listen occasionally in a random fashion, to the PSCCH when the UE 204 is in the power saving state 223.

At 506, a UE receives a message from the other UE through the PC5 interface for sidelink communication when the UE is in the active state. For example, as described for FIG. 2A, the UE 204 receives a message from the UE 202 through the PC5 interface for sidelink communication when the UE 204 is in the active state 221.

The method 510 is shown in details in FIG. 5B. At 512, a UE receives a configuration for a DRX cycle having a sidelink on-duration period within the DRX cycle, where the UE is in an active state during the sidelink on-duration period, and the UE is in a power saving state outside the sidelink on-duration period. For example, as shown in FIG. 2A, the UE 204 receives a configuration for the DRX cycle 215 having the sidelink on-duration period 217 within the DRX cycle 215. The UE 204 is in the active state 221 during the sidelink on-duration period 217, and the UE is in the power saving state 223 outside the sidelink on-duration period 217, as described for FIG. 2A.

At 514, a UE sets an activity tracking timer to keep track of the DRX cycle and the sidelink on-duration period based on an offset with respect to a time reference. For example, as described for FIGS. 2A and 3A, the UE 204 sets an activity tracking timer to keep track of the DRX cycle 301 and the sidelink on-duration period 302 with respect to the time reference 309, where the offset is 0. As described for FIGS. 2A and 3C, the UE 204 sets an activity tracking timer to keep track of the DRX cycle 321 and the sidelink on-duration period 322 based on the offset 331 with respect to the time reference 329. In some examples, the UE 204 can set up multiple timers to perform the described functions. For example, the UE 204 can set a first timer to be the activity tracking timer to keep track of the DRX cycle 321, and set a second timer to keep track the sidelink on-duration period 322. In addition, the UE 204 can set a third timer to keep track of the offset 331. Once the offset 331 time reaches the specified period, the first timer to keep track of the DRX cycle 321 and the second timer to keep track the sidelink on-duration period 322 can start at the same time when the offset 331 time reaches the specified period. The second timer expires at the end of the sidelink on-duration period 322, while the first timer continues till the end of the DRX cycle 321. In some example, the configuration for the DRX cycle 321, the sidelink on-duration period 322, and the offset 331 with respect to the time reference 329 is configured in a RRC message from the base station 201 to the UE 204. Based the this discussion, one skilled in the art will recognize different ways to implement the operations at 514, using one timer, two timers, three times, or even four timers to track the various time periods, e.g., the offset 331, the DRX cycle 321, or the sidelink on-duration period 322.

At 516, a UE determines whether a message is received in the PSCCH from an other UE through the PC5 interface for sidelink communication when the sidelink on-duration period of the UE is not expired. The message received can have a destination address that matches a sidelink address of the UE. For example, as described for FIGS. 2A and 3A, the UE 204 receives a message in the PSCCH from the UE 202 through the PC5 interface for sidelink communication when the sidelink on-duration period 302 of the UE 204 is not expired. When the sidelink on-duration period 302 is not expired, the UE 204 is in the active state, and can receive a message in the PSCCH when the message has a destination address that matches a sidelink address of the UE 204.

At 518, a UE restarts the activity tracking timer to keep track of the DRX cycle and the sidelink on-duration period after receiving the message. In some examples, the activity tracking timer can keep track of sidelink activities within the DRX cycle. For example, as described for FIG. 2A 3A or 3C, the UE 204 restarts the activity tracking timer to keep track of the DRX cycle 301 and the sidelink on-duration period 302 after receiving the message, or restarts the activity tracking timer to keep track of the DRX cycle 321 and the sidelink on-duration period 322 after receiving the message.

At 520, a UE determines whether the sidelink on-duration period has expired. When the sidelink on-duration period has not expired, the UE continues to listen to the PSCCH and/or receive a message in the PSCCH from the other UE through the PC5 interface for sidelink communication when the UE is in the active state, as described at 516. On the other hand, when the sidelink on-duration period has expired, the UE skips receiving any further message in the PSCCH until the next on-duration period begins, and goes back to 514 to set the activity tracking timer to keep track of the DRX cycle and the sidelink on-duration period based on an offset with respect to a time reference. In some embodiments, the expiration on the sidelink on-duration period can be represented by the expiration of a timer keeping track of the sidelink on-duration period.

There can be additional operations, not shown in the method 510, performed by the UE. For example, as shown at 504 described for FIG. 5A, the UE listens to a PSCCH during at least one slot within the sidelink on-duration period for a message from an other UE that wirelessly communicates through a PC5 interface for sidelink communication with the UE, where the UE does not listen to PSCCH when the UE is in the power saving state.

FIG. 6 illustrates a block diagram of an example system 600 of an electronic device implementing designs for sidelink communications among multiple UEs, according to some aspects of the disclosure. System 600 may be any of the electronic devices (e.g., the base station 101, the UE 102, the UE 103, the UE 104, the UE 106, the UE 108) of system 100, or the UE 202, the UE 204, the UE 206 of the system 200 in FIG. 2A. The system 600 includes a processor 610, one or more transceivers 620, communication infrastructure 640, memory 650, operating system 652, application 654, and one or more antenna 660. Illustrated systems are provided as exemplary parts of system 600, and system 600 can include other circuit(s) and subsystem(s). Also, although the systems of system 600 are illustrated as separate components, the aspects of this disclosure can include any combination of these, less, or more components.

Memory 650 may include random access memory (RAM) and/or cache, and may include control logic (e.g., computer software) and/or data. Memory 650 may include other storage devices or memory such as, but not limited to, a hard disk drive and/or a removable storage device/unit. According to some examples, operating system 652 can be stored in memory 650. Operating system 652 can manage transfer of data from memory 650 and/or one or more applications 654 to processor 610 and/or one or more transceivers 620. In some examples, operating system 652 maintains one or more network protocol stacks (e.g., Internet protocol stack, cellular protocol stack, and the like) that can include a number of logical layers. At corresponding layers of the protocol stack, operating system 652 includes control mechanism and data structures to perform the functions associated with that layer.

According to some examples, application 654 can be stored in memory 650. Application 654 can include applications (e.g., user applications) used by wireless system 600 and/or a user of wireless system 600. The applications in application 654 can include applications such as, but not limited to, Siri™, FaceTime™, radio streaming, video streaming, remote control, and/or other user applications.

System 600 can also include communication infrastructure 640. Communication infrastructure 640 provides communication between, for example, processor 610, one or more transceivers 620, and memory 650. In some implementations, communication infrastructure 640 may be a bus. Processor 610 together with instructions stored in memory 650 performs operations enabling system 600 to implement mechanisms for sidelink communications among multiple UEs, as described herein for the system 100 as shown in FIG. 1, the system 200 as shown in FIG. 2A, the method 400, the method 500, or the method 510.

One or more transceivers 620 transmit and receive communications signals that support mechanisms for sidelink communications among multiple UEs, as described herein for the system 100 as shown in FIG. 1, the system 200 as shown in FIG. 2A, the method 400, the method 500, or the method 510. Additionally, one or more transceivers 620 transmit and receive communications signals that support mechanisms for sidelink communications among multiple UEs, as described herein for the system 100 as shown in FIG. 1, the system 200 as shown in FIG. 2A, the method 400, the method 500, or the method 510. According to some aspects, one or more transceivers 620 may be coupled to antenna 660. Antenna 660 may include one or more antennas that may be the same or different types. One or more transceivers 620 allow system 600 to communicate with other devices that may be wired and/or wireless. In some examples, one or more transceivers 620 can include processors, controllers, radios, sockets, plugs, buffers, and like circuits/devices used for connecting to and communication on networks. According to some examples, one or more transceivers 620 include one or more circuits to connect to and communicate on wired and/or wireless networks.

According to some aspects of this disclosure, one or more transceivers 620 can include a cellular subsystem, a WLAN subsystem, and/or a Bluetooth™ subsystem, each including its own radio transceiver and protocol(s) as will be understood by those skilled arts based on the discussion provided herein. In some implementations, one or more transceivers 620 can include more or fewer systems for communicating with other devices.

In some examples, one or more transceivers 620 can include one or more circuits (including a WLAN transceiver) to enable connection(s) and communication over WLAN networks such as, but not limited to, networks based on standards described in IEEE 802.11.

Additionally, or alternatively, one or more transceivers 620 can include one or more circuits (including a Bluetooth™ transceiver) to enable connection(s) and communication based on, for example, Bluetooth™ protocol, the Bluetooth™ Low Energy protocol, or the Bluetooth™ Low Energy Long Range protocol. For example, one or more transceivers transceiver 620 can include a Bluetooth™ transceiver.

Additionally, one or more transceivers 620 can include one or more circuits (including a cellular transceiver) for connecting to and communicating on cellular networks. The cellular networks can include, but are not limited to, 3G/4G/5G networks such as Universal Mobile Telecommunications System (UMTS), Long-Term Evolution (LTE), and the like. For example, one or more transceivers 220 can be configured to operate according to one or more of Rel-15, Rel-16, Rel-17, or later of 3GPP standard.

According to some aspects of this disclosure, processor 610, alone or in combination with computer instructions stored within memory 650, and/or one or more transceiver 620, implements the methods and mechanisms discussed in this disclosure. For example, processor 610, alone or in combination with computer instructions stored within memory 650, and/or one or more transceiver 620, implements mechanisms for sidelink communications among multiple UEs. According to some aspects of this disclosure, processor 610, alone or in combination with computer instructions stored within memory 650, and/or one or more transceiver 620, can receive a configuration for the DRX cycle 215 having the sidelink on-duration period 217, listen to a PSCCH during at least one slot within the sidelink on-duration period 217 for a message from the UE 202 that wirelessly communicates through a PC5 interface for sidelink communication with the UE 204, and further receive a message from the UE 202 through the PC5 interface for sidelink communication when the UE 204 is in the active state.

Various aspects can be implemented, for example, using one or more computer systems, such as computer system 700 shown in FIG. 7. Computer system 700 can be any computer capable of performing the functions described herein such as the UE 102, the UE 103, the UE 104, the UE 106, the UE 108 in in FIG. 1, the UE 202, the UE 204, the UE 206 in FIG. 2A, or 600 of FIG. 6. Computer system 700 includes one or more processors (also called central processing units, or CPUs), such as a processor 704. Processor 704 is connected to a communication infrastructure 706 (e.g., a bus). Computer system 700 also includes user input/output device(s) 703, such as monitors, keyboards, pointing devices, etc., that communicate with communication infrastructure 706 through user input/output interface(s) 702. Computer system 700 also includes a main or primary memory 708, such as random access memory (RAM). Main memory 708 may include one or more levels of cache. Main memory 708 has stored therein control logic (e.g., computer software) and/or data.

Computer system 700 may also include one or more secondary storage devices or memory 710. Secondary memory 710 may include, for example, a hard disk drive 712 and/or a removable storage device or drive 714. Removable storage drive 714 may be a floppy disk drive, a magnetic tape drive, a compact disk drive, an optical storage device, tape backup device, and/or any other storage device/drive.

Removable storage drive 714 may interact with a removable storage unit 718. Removable storage unit 718 includes a computer usable or readable storage device having stored thereon computer software (control logic) and/or data. Removable storage unit 718 may be a floppy disk, magnetic tape, compact disk, DVD, optical storage disk, and/any other computer data storage device. Removable storage drive 714 reads from and/or writes to removable storage unit 718 in a well-known manner.

According to some aspects, secondary memory 710 may include other means, instrumentalities or other approaches for allowing computer programs and/or other instructions and/or data to be accessed by computer system 700. Such means, instrumentalities or other approaches may include, for example, a removable storage unit 722 and an interface 720. Examples of the removable storage unit 722 and the interface 720 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

In some examples, main memory 708, the removable storage unit 718, the removable storage unit 722 can store instructions that, when executed by processor 704, cause processor 704 to perform operations for a UE, e.g., the UE 102, the UE 103, the UE 104, the UE 106, the UE 108 in in FIG. 1, the UE 202, the UE 204, the UE 206 in FIG. 2A. In some examples, the operations include determining a first DRX cycle of a first receiver UE, and a second DRX cycle of a second receiver UE, where the first receiver UE and the second receiver UE are among a group of UEs to that wirelessly communicate with the UE for sidelink communication: determining a first sidelink on-duration period within the first DRX cycle when the first receiver UE is in an active state, and a second sidelink on-duration period within the second DRX cycle when the second receiver UE is in an active state; determining one or more slots when the first receiver UE and the second receiver UE are both in the active state; and sending a message to the first receiver UE and the second receiver UE in a one-to-many communication during the determined one or more slots.

Computer system 700 may further include a communication or network interface 724. Communication interface 724 enables computer system 700 to communicate and interact with any combination of remote devices, remote networks, remote entities, etc. (individually and collectively referenced by reference number 728). For example, communication interface 724 may allow computer system 700 to communicate with remote devices 728 over communications path 726, which may be wired and/or wireless, and which may include any combination of LANs, WANs, the Internet, etc. Control logic and/or data may be transmitted to and from computer system 700 via communication path 726.

The operations in the preceding aspects can be implemented in a wide variety of configurations and architectures. Therefore, some or all of the operations in the preceding aspects may be performed in hardware, in software or both. In some aspects, a tangible, non-transitory apparatus or article of manufacture includes a tangible, non-transitory computer useable or readable medium having control logic (software) stored thereon is also referred to herein as a computer program product or program storage device. This includes, but is not limited to, computer system 700, main memory 708, secondary memory 710 and removable storage units 718 and 722, as well as tangible articles of manufacture embodying any combination of the foregoing. Such control logic, when executed by one or more data processing devices (such as computer system 700), causes such data processing devices to operate as described herein.

Based on the teachings contained in this disclosure, it will be apparent to persons skilled in the relevant art(s) how to make and use aspects of the disclosure using data processing devices, computer systems and/or computer architectures other than that shown in FIG. 7. In particular, aspects may operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more, but not all, exemplary aspects of the disclosure as contemplated by the inventor(s), and thus, are not intended to limit the disclosure or the appended claims in any way.

While the disclosure has been described herein with reference to exemplary aspects for exemplary fields and applications, it should be understood that the disclosure is not limited thereto. Other aspects and modifications thereto are possible, and are within the scope and spirit of the disclosure. For example, and without limiting the generality of this paragraph, aspects are not limited to the software, hardware, firmware, and/or entities illustrated in the figures and/or described herein. Further, aspects (whether or not explicitly described herein) have significant utility to fields and applications beyond the examples described herein.

Aspects have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. In addition, alternative aspects may perform functional blocks, steps, operations, methods, etc. using orderings different from those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other aspects whether or not explicitly mentioned or described herein.

The breadth and scope of the disclosure should not be limited by any of the above-described exemplary aspects, but should be defined only in accordance with the following claims and their equivalents.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

For one or more embodiments or examples, at least one of the components set forth in one or more of the preceding figures may be configured to perform one or more operations, techniques, processes, and/or methods as set forth in the example section below. For example, circuitry associated with a UE, base station, network element, etc. as described above in connection with one or more of the preceding figures may be configured to operate in accordance with one or more of the examples set forth below % in the example section.

What is claimed is:

1. A user equipment (UE), comprising:
 a transceiver configured to wirelessly communicate through a first interface for sidelink communication with one or more UEs including a first receiver UE and a second receiver UE; and
 a processor communicatively coupled to the transceiver and configured to:
  determine a first discontinuous reception (DRX) cycle of the first receiver UE that includes a first number of slots;
  determine a sidelink on-duration period within the first DRX cycle of the first receiver UE, wherein the first receiver UE is in an active state to listen to a Physical Sidelink Control Channel (PSCCH) during the sidelink on-duration period, and wherein the sidelink on-duration period includes a second number of slots within the first DRX cycle that is less than the first number of slots within the first DRX cycle, and wherein the second number of slots is larger than one slot; and send a message, using the transceiver, to the first receiver UE during one or more slots of the sidelink on-duration period, wherein the processor is further configured to:

determine a second DRX cycle of the second receiver UE;

determine a second sidelink on-duration period within the second DRX cycle, wherein during the second sidelink on-duration period, the second receiver UE is in the active state to listen to the PSCCH;

determine one or more slots of the second DRX cycle when the first receiver UE and the second receiver UE are both in the active state; and send an other message, using the transceiver, to the first receiver UE and the second receiver UE in a one-to-many communication during the one or more slots when the first receiver UE and the second receiver UE are both in the active state.

2. The UE of claim 1, wherein the transceiver is further configured to wirelessly communicate with a base station through a second interface supporting uplink and downlink transmissions between the base station and the UE, wherein the first interface is a PC5 interface and the second interface is a Uu interface.

3. The UE of claim 1, wherein the first DRX cycle of the first receiver UE further includes a power saving state having a third number of slots, and wherein the first receiver UE refrains from listening to the PSCCH during the power saving state.

4. The UE of claim 1, wherein the second number of slots within the sidelink on-duration period are consecutive slots.

5. The UE of claim 1, wherein the message to the first receiver UE is carried in a sidelink medium access control (MAC) Control Element (MAC CE), and includes a configuration to define one or more slots for the first receiver UE to respond to the UE.

6. The UE of claim 1, wherein the message is sent to the first receiver UE by a broadcast transmission, a groupcast transmission, or a unicast transmission.

7. The UE of claim 1, wherein the first receiver UE is an in-coverage UE, an out-of-coverage UE, or a partial-coverage UE.

8. The UE of claim 1, wherein the first DRX cycle of the first receiver UE has a same time period as the second DRX cycle of the second receiver UE with respect to a timing reference, and the sidelink on-duration period has a same time period as the second sidelink on-duration period with respect to the timing reference.

9. The UE of claim 1, wherein the first DRX cycle of the first receiver UE has a first offset with respect to a timing reference, and the second DRX cycle of the second receiver UE has a second offset with respect to the timing reference, and wherein the first offset has a length different from a length of the second offset.

10. The UE of claim 1, wherein the first DRX cycle of the first receiver UE has a first length, the second DRX cycle of the second receiver UE has a second length, and the first length is ½ of the second length or ¼ of the second length.

11. The UE of claim 1, wherein the sidelink on-duration period has a length different from a length of the second sidelink on-duration period.

12. A method for operating a user equipment (UE), comprising:

receiving a configuration for a first discontinuous reception (DRX) cycle having a sidelink on-duration period within the first DRX cycle, wherein the UE is in an active state during the sidelink on-duration period, and the UE is in a power saving state outside the sidelink on-duration period, wherein the first DRX cycle includes a first number of slots, the sidelink on-duration period includes a second number of slots within the first DRX cycle, and wherein the second number of slots is larger than one slot and less than the first number of slots;

listening to a Physical Sidelink Control Channel (PSCCH) during at least one slot within the sidelink on-duration period for a message from an other UE that wirelessly communicates through a PC5 interface for sidelink communication with the UE, wherein the UE refrains from listening to PSCCH when the UE is in the power saving state, wherein the at least one slot within the sidelink on-duration period for listening to the message is shared by a receiver UE in the active state within a second DRX cycle during which to listen to the PSCCH from the other UE; and receiving the message from the other UE, wherein the message is sent to the UE and the receiver UE in a one-to-many communication during the at least one slot when the UE and the receiver UE are both in the active state.

13. The method of claim 12, further comprising:

receiving the message from the other UE through the PC5 interface for the sidelink communication when the UE is in the active state.

14. The method of claim 13, further comprising:

determining, based on the received message, a configuration that defines one or more slots for the UE to respond to the other UE; and sending a response message to the other UE based on the determined configuration.

15. The method of claim 13, wherein the receiving the message from the other UE includes receiving the message by a broadcast transmission, a groupcast transmission, or a unicast transmission.

16. The method of claim 13, wherein the other UE is an in-coverage UE, an out-of-coverage UE, or a partial-coverage UE.

17. A method for operating a user equipment (UE), comprising:

receiving a configuration for a first discontinuous reception (DRX) cycle having a sidelink on-duration period within the first DRX cycle, wherein the UE is in an active state during the sidelink on-duration period, and the UE is in a power saving state outside the sidelink on-duration period, wherein the first DRX cycle includes a first number of slots, and the sidelink on-duration period includes a second number of slots within the first DRX cycle, and wherein the second number of slots is larger than one slot and less than the first number of slots;

setting an activity tracking timer to keep track of the first DRX cycle and the sidelink on-duration period based on an offset with respect to a time reference;

listening to a Physical Sidelink Control Channel (PSCCH) during at least one slot within the sidelink on-duration period for a message from an other UE that wirelessly communicates through a PC5 interface for sidelink communication with the UE, wherein the at least one slot within the sidelink on-duration period for listening to the message is shared by a receiver UE in the active state within a second DRX cycle during which to listen to the PSCCH from the other UE;

receiving the message in the PSCCH from the other UE through the PC5 interface for the sidelink communication when the UE is in the active state and the message is sent to the UE and the receiver UE in a one-to-many communication during the at least one slot when the UE and the receiver UE are both in the active state; and restarting the activity tracking timer to keep track of the first DRX cycle and the sidelink on-duration period after receiving the message.

18. The method of claim 17, wherein the configuration for the first DRX cycle, the sidelink on-duration period, and the offset with respect to the time reference is configured in a Radio Resource Control (RRC) message from a base station that wirelessly communicates to the UE through an interface supporting uplink and downlink transmissions between the base station and the UE.

19. The method of claim 17, wherein the setting the activity tracking timer to keep track of the first DRX cycle and the sidelink on-duration period includes:

setting a first timer to be the activity tracking timer to keep track of the first DRX cycle; and setting a second timer to keep track the sidelink on-duration period.

* * * * *